(12) United States Patent
Chiang et al.

(10) Patent No.: US 8,625,700 B2
(45) Date of Patent: Jan. 7, 2014

(54) EVALUATION DEVICE FOR PROVIDING A TRANSCEIVER SYSTEM WITH TRANSCEIVING PERFORMANCE INFORMATION THEREOF

(75) Inventors: Ching-Tai Chiang, Kaohsiung (TW);
Rong-Ching Wu, Kaohsiung (TW);
Chen-Sen Ouyang, Kaohsiung (TW);
Jong-Ian Tsai, Kaohsiung (TW)

(73) Assignee: I-Shou University, Kaohsiung (TW)

( * ) Notice: Subject to any disclaimer, the term of this patent is extended or adjusted under 35 U.S.C. 154(b) by 0 days.

(21) Appl. No.: 13/435,157

(22) Filed: Mar. 30, 2012

(65) Prior Publication Data

US 2013/0028310 A1 Jan. 31, 2013

(51) Int. Cl.
*H04B 7/02* (2006.01)

(52) U.S. Cl.
USPC ........... 375/267; 342/423; 343/751; 375/295; 375/299; 375/347; 455/101

(58) Field of Classification Search
None
See application file for complete search history.

(56) References Cited

U.S. PATENT DOCUMENTS

2005/0047517 A1* 3/2005 Georgios et al. ............... 375/267
2011/0261898 A1* 10/2011 Huang et al. .................. 375/295

* cited by examiner

*Primary Examiner* — Adolf Dsouza
(74) *Attorney, Agent, or Firm* — Alan Kamrath; Kamrath IP Lawfirm, P.A.

(57) ABSTRACT

An evaluation device provides a transceiver system with performance information. The transceiver system models channels between a transmitter and a receiver thereof using Nakagami distribution with a fading parameter. The evaluation device includes a setting module, a computing module and an output module. The computing module is operable, based upon the fading parameter, an average SNR of the channels, a number of transmit antennas and a number of receive antennas, to estimate an average output SNR, a bit error rate and an outage probability related to signals received by the receiver. The output module is operable to provide the transceiver system with the average SNR and the estimated information as the performance information.

7 Claims, 7 Drawing Sheets

EVALUATION DEVICE FOR PROVIDING A TRANSCEIVER SYSTEM WITH TRANSCEIVING PERFORMANCE INFORMATION THEREOF

BACKGROUND OF THE INVENTION

1. Field of the Invention

The present invention relates to an evaluation device for providing a transceiver system with performance information thereof, more particularly to an evaluation device for providing a transceiver system, which models a channel thereof using Nakagami distribution, with transceiving performance information thereof.

2. Description of the Related Art

Referring to FIG. 1, a conventional transceiver system 900 under a transmit antenna selection/maximal-ratio combining (TAS/MRC) scheme includes a transmitter ($T_x$) and a receiver ($R_x$). The transmitter ($T_x$) includes a modulator 91, a diversity unit 92 electrically connected to the modulator 91, and a plurality of transmit antennas 93 electrically connected to the diversity unit 92. The receiver ($R_x$) includes a plurality of receive antennas 94, a synthesis unit 95 electrically connected to the receive antennas 94, and a demodulator 96 electrically connected to the synthesis unit 95.

The conventional transceiver system 900 is operable, in advance, to estimate the channels between the transmitter ($T_x$) and the receiver ($R_x$), so that the diversity unit 92 of the transmitter ($T_x$) is operable to select one of the transmit antennas 93, which results in a channel that has relatively better performance, for transmitting a signal generated by the modulator 91. Then, when the receive antennas 94 of the receiver ($R_x$) receive signals from the selected one of the transmit antennas 93, the synthesis unit 95 of the receiver ($R_x$) is operable to weight and synthesize the signals received by the receive antennas 94. Accordingly, performance of the conventional transceiver system 900 is optimized, that is to say, the conventional transceiver system 900 has, for example, a relatively greater diversity gain or a relatively greater average signal-to-noise ratio (SNR).

However, the conventional transceiver system 900 under the TAS/MRC scheme merely has the optimized performance for a single receiver (Rx). When further including additional receivers (Rx), the conventional transceiver system 900 may not be able to optimize transmission performance between the transmitter ($T_x$) and some of the receivers ($R_x$), and thus, the overall performance thereof may be decreased.

Accordingly, a transmit generalized selection/maximal-ratio combining (TGS/MRC) scheme is provided as a solution for the above-mentioned drawback of the conventional transceiver system 900 under the TAS/MRC scheme. In particular, a conventional transceiver system under the TGS/MRC scheme does not have to select one of transmit antennas, which may result in a channel that has relatively better performance, for transmitting signals, and can be operable to transmit signals with a different one of the transmit antennas according to a different situation so as to ensure the overall performance thereof and transmission quality for various receivers.

In "Performance of Selection MIMO Systems with Generalized Selection Criterion over Nakagami-m Fading Channels," *IEICE Trans. Commun.*, E89-B(12), pages 3467-3470, 2006, S. Choi and Y. C. Ko proposed a method for evaluating performance of the conventional transceiver system under the TGS/MRC scheme by using Nakagami channel model (see Nakagami distribution shown in FIG. 2) to simulate the channels of the conventional transceiver system under the TGS/MRC scheme. In this method, an average output SNR and a bit error rate are computed for evaluating performance of the conventional transceiver system under the TGS/MRC scheme. However, the computational load of the average output SNR and the bit error rate is considerably large, that is to say, a number $m \times L_R$ of summation operations are executed for obtaining the average output SNR and the bit error rate, where m is a fading parameter of the Nakagami distribution and $L_R$ is a number of the receiver antennas. Further, computation of an outage probability of the conventional transceiver system is not provided in this method.

SUMMARY OF THE INVENTION

Therefore, an object of the present invention is to provide an evaluation device that requires fewer computations for providing a transceiver system with transceiving performance information thereof.

Accordingly, an evaluation device of the present invention is configured to provide a transceiver system with transceiving performance information thereof. The transceiver system includes a transmitter having a plurality of transmit antennas and a receiver having a plurality of receive antennas for receiving signals from the transmitter, and models channels between the transmitter and the receiver using Nakagami distribution with a fading parameter. The evaluation device comprises a setting module, a computing module and an output module.

The setting module is operable to set an average signal-to-noise ratio (SNR) for the channels between the transmitter and the receiver of the transceiver system. The computing module is operable, based upon the fading parameter, the average SNR, a number of the transmit antennas and a number of the receive antennas, to estimate at least one of an average output SNR, a bit error rate and an outage probability that are related to signals received by the receiver of the transceiver system. The output module is operable to provide the transceiver system with the average SNR and said at least one of the average output SNR, the bit error rate and the outage probability as the transceiving performance information of the transceiver system.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
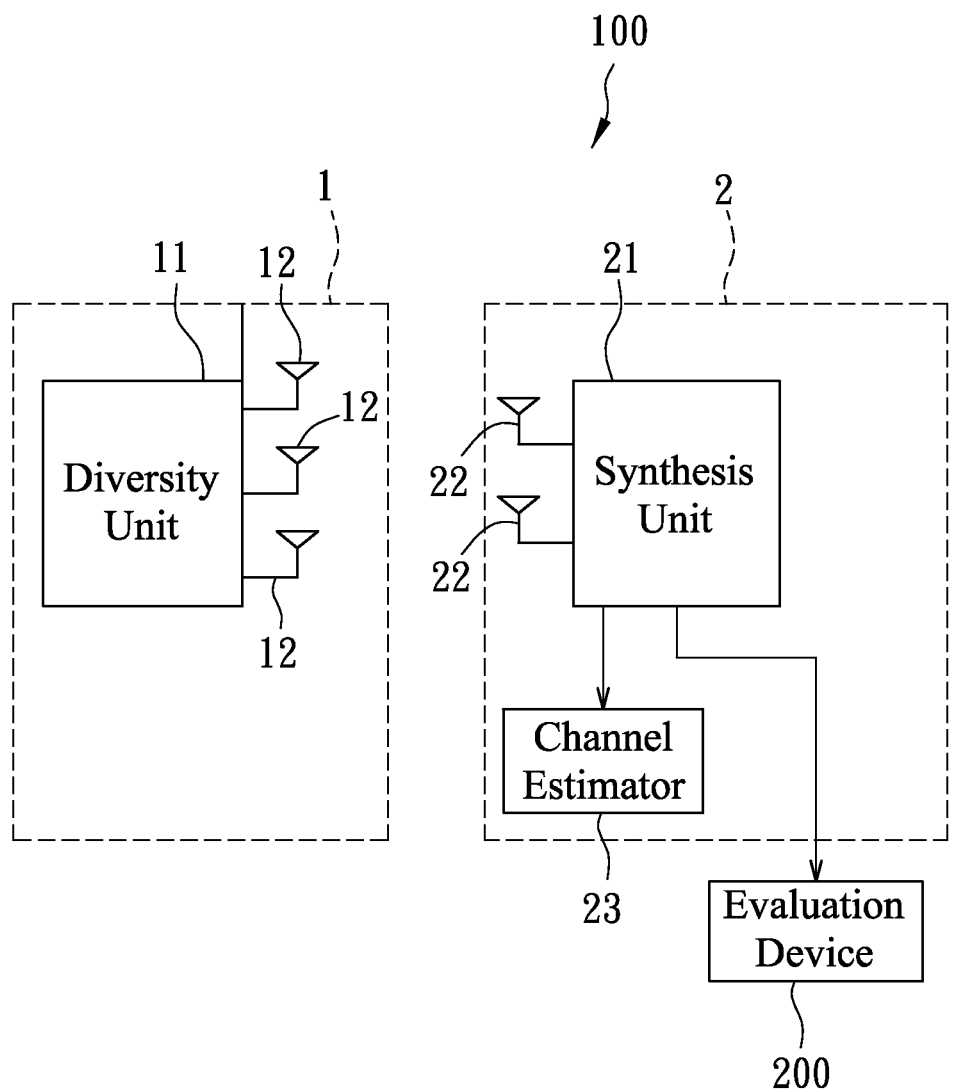
FIG. 3 is a block diagram illustrating a transceiver system provided with a preferred embodiment of an evaluation device of this invention.

Referring to FIG. 3, a transceiver system 100 under a transmit generalized selection/maximal-ratio combining (TGS/MRC) scheme includes a transmitter 1 and a receiver 2 coupled to the preferred embodiment of an evaluation device 200 of this invention. For instance, the transmitter 1 is a base station, and the receiver 2 is a cell phone. The transmitter 1 includes a diversity unit 11 and a number ($L_T$, $L_T>1$) of transmit antennas 12, and the receiver 2 includes a number ($L_R$, $L_R>1$) of receive antennas 22, a synthesis unit 21, and a channel estimator 23. For illustrative purposes, in FIG. 3, the transmitter 1 includes three ($L_T=3$) of the transmit antennas 12, and the receiver 2 includes two ($L_R=2$) of the receive antennas 22.

Figure 1:
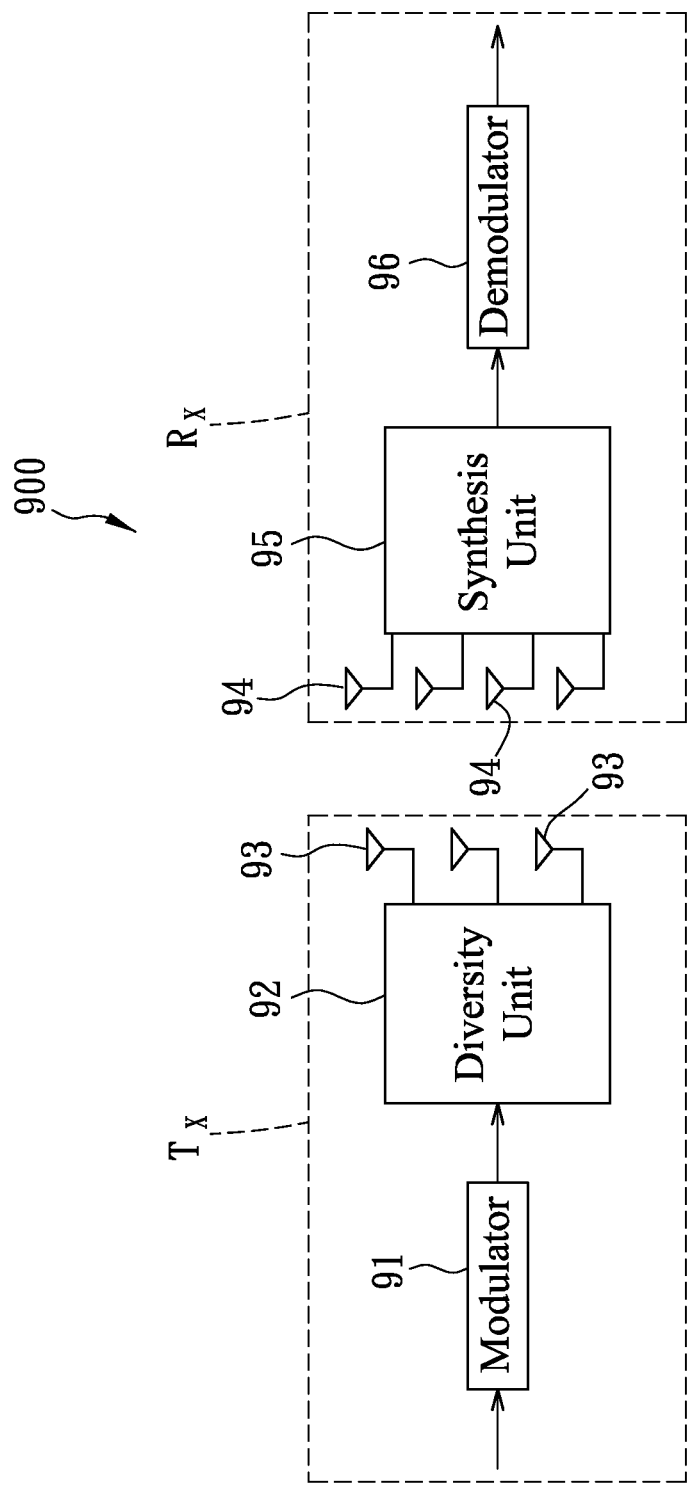
FIG. 1 is a block diagram illustrating a conventional transceiver system.
Figure 2:
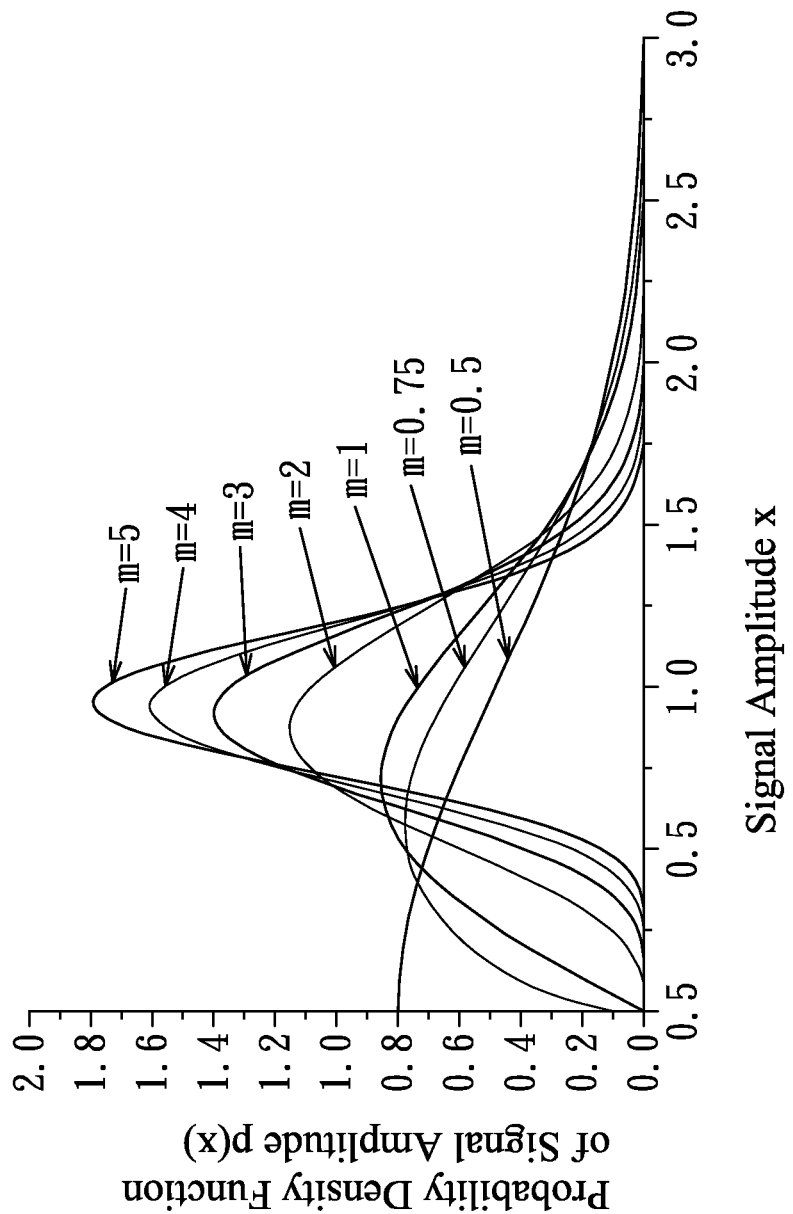
FIG. 2 is a plot to illustrate Nakagami distribution.

In such a TGS/MRC scheme, there are a number ($L_T \times L_R$) of possible channels, each of which is defined by one of the transmit antennas 12 and one of the receive antennas 22 and can be simulated using Nakagami channel model (see Nakagami distribution shown in FIG. 2) with a positive fading parameter (m). The channel estimator of the receiver 2 is operable to estimate an instantaneous output signal-to-noise ratio (SNR) of a synthesized signal generated by the synthesis unit 21 applying maximal-ratio combining to signals received by the receive antennas 22 from each one of the transmit antennas 12, and to provide the diversity unit 11 of the transmitter 1 with a number ($L_T$) of the instantaneous output SNRs corresponding respectively to the transmit antennas 12. Accordingly, the diversity unit 11 is operable to sort the instantaneous output SNRs in a specified sequence according to increasing magnitude, and to assign the transmit antennas 12 with respective positive integer ordinal numbers (l, $1 \leq l \leq L_T$) according to the specified sequence. In particular, a smaller one of the ordinal numbers (l) indicates a corresponding one of the transmit antennas 12 with a smaller instantaneous output SNR.

Under the TGS/MRC scheme, the diversity unit 11 is operable to select one of the transmit antennas 12, which corresponds to one of the ordinal numbers (l), for transmitting signals, and the channels between the selected one of the transmit antennas 12 and the receive antennas 22 are simulated using the Nakagami channel model (see FIG. 2) and preferably have a same average signal-to-noise ratio (SNR, $\bar{\gamma}$). When the fading parameter (m) of the Nakagami channel model and the number ($L_R$) of the receive antennas 22 is an integer, an average output SNR ($\bar{\gamma}_{(l)}$), a bit error rate ($P_{BER}$) and an outage probability ($P_{out}(R,\bar{\gamma})$) of the synthesized signal outputted by the synthesis unit 21 can be computed based upon the following Equations (1) to (5).

Generally, the average output SNR ($\bar{\gamma}_{(l)}$) can be expressed as $$\bar{\gamma}_{(l)} = \frac{l(\bar{\gamma}/m)}{(mL_R-1)!}\binom{L_T}{l} \quad (1)$$

$$\sum_{n=0}^{l-1}\binom{l-1}{n}(-1)^n \sum_{k=0}^{(L_T-l+n)(mL_R-1)} \beta_k \frac{(mL_R+k)!}{(L_T-l+n+1)^{mL_R+k+1}}$$

where $\beta_0=1$, $\beta_1=L_T-l+n$, $$\beta_k = \frac{1}{k}\sum_{j=1}^{\min(k,mL_R-1)} \frac{j(L_T-l+n+1)-k}{j!}\beta_{k-j}$$

for $2 \leq k \leq (L_T-l+n)(mL_R-1)-1$, and $\beta_k=[(mL_R-1)!]^{-(L_T-l+n)}$ for $k=(L_T-l+n)(mL_R-1)$.

When the transceiver system 100 is configured to perform signal modulation using binary phase-shift keying (BPSK), the bit error rate ($P_{BER}$) of the synthesized signal outputted by the synthesis unit 21 can be expressed as $$P_{BER} = \frac{l}{(mL_R-1)!}\binom{L_T}{l}\sum_{n=0}^{l-1}\binom{l-1}{n}(-1)^n \times \quad (2)$$

$$\sum_{k=0}^{(L_T-l+n)(mL_R-1)} \beta_k \frac{(mL_R+k-1)!}{(L_T-l+n+1)^{mL_R+k}} \left[\frac{1}{2}\left(1-\sqrt{\frac{\alpha}{1+\alpha}}\right)\right]^{mL_R+k} \times$$

$$\sum_{j=0}^{mL_R+k-1}\binom{mL_R+k-1+j}{j}\left[\frac{1}{2}\left(1+\sqrt{\frac{\alpha}{1+\alpha}}\right)\right]^j$$

where $\alpha=\bar{\gamma}/[m(L_T-l+n+1)]$. Further, when the SNR ($\bar{\gamma}$) is considerably greater than 1 (i.e., the SNR ($\bar{\gamma}$) is greater than a predetermined value), Equation (2) can simplified as Equation (3).

$$P_{BER} = \frac{(2mlL_R-1)!}{2^{2mlL_R-1}[(mL_R)!]^l(mlL_R-1)!}\binom{L_T}{l}\left(\frac{m}{\bar{\gamma}}\right)^{mlL_R} \quad (3)$$

The outage probability ($P_{out}(R,\bar{\gamma})$) means the probability that the instantaneous channel capacity of the transceiver system 100 is smaller than a given capacity (R), and can be expressed as $$P_{out}(R,\bar{\gamma}) = \frac{l}{(mL_R-1)!}\binom{L_T}{l}\sum_{n=0}^{l-1}\binom{l-1}{n}(-1)^n \times \quad (4)$$

$$\sum_{k=0}^{(L_T-l+n)(mL_R-1)} \beta_k \frac{\gamma(mL_R+k,[L_T-l+n+1]m\lambda/\bar{\gamma})}{[L_T-l+n+1]^{mL_R+k}}$$

where $\gamma(\ )$ is a low-level incomplete Gamma function, and $\lambda=2^R-1$.

Similarly, when the SNR ($\bar{\gamma}$) is considerably greater than 1 (i.e., the SNR ($\bar{\gamma}$) is greater than a predetermined value), Equation (4) can simplified as Equation (5).

$$P_{out}(R, \bar{\gamma}) = \frac{m^{mL_R}}{[(mL_R)!]^l} \binom{L_T}{l} \left(\frac{\lambda}{\bar{\gamma}}\right)^{mL_R} \quad (5)$$

It should be noted that, although the transceiver system 100 is exemplarily illustrated as the TGS/MRC scheme, configuration thereof may be considered as a transmit antenna selection/maximal-ratio combining (TAS/MRC) scheme when the ordinal number (l) is equal to the number ($L_T$) of the transmit antennas 12. Further, the Nakagami channel model is able to cover a wide range of fading severity due to variation of the fading parameter (m), and includes the Rayleigh fading channel (i.e., m=1) as a special case.

Figure 4:
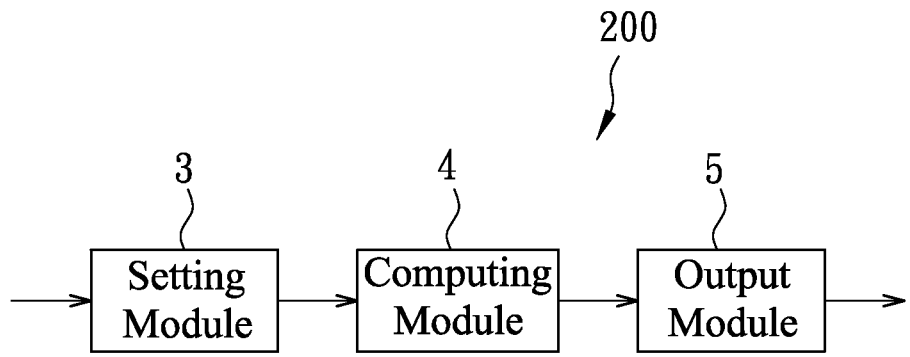
FIG. 4 is a block diagram illustrating the evaluation device of the preferred embodiment.

Referring to FIGS. 3 and 4, the evaluation device 200 of the preferred embodiment is configured for analyzing the synthesized signal from the synthesis unit 21 so as to provide the transceiver system 100 with the transceiving performance information of the transceiver system 100. The evaluation device 200 includes a setting module 3, a computing module 4 coupled to the setting module 3, and an output module 5 coupled to the computing module 4.

The setting module 3 is operable to set the average signal-to-noise ratio ($\gamma$) for the possible channels between the transmitter 1 and the receiver 2 of the transceiver system 100. Based upon one of the ordinal numbers (l), the fading parameter (m) of Nakagami distribution, the average SNR ($\bar{\gamma}$), the number ($L_T$) of the transmit antennas 12, and the number ($L_R$) of the receive antennas 22, the computing module 4 is operable to estimate at least one of the average output SNR ($\bar{\gamma}_{(l)}$), the bit error rate ($P_{BER}$) and the outage probability ($P_{out}(R,\bar{\gamma})$) of the synthesized signal according to an appropriate one of Equations (1) to (5). Then, the output module 5 is operable to provide the transceiver system 100 with the average SNR ($\bar{\gamma}$) and said at least one of the average output SNR ($\bar{\gamma}_{(l)}$), the bit error rate ($P_{BER}$) and the outage probability ($P_{out}(R,\bar{\gamma})$) as the transceiving performance information of the transceiver system 100.

It can be appreciated that, when the computing module 4 computes the average output SNR ($\bar{\gamma}_{(l)}$), the bit error rate ($P_{BER}$) and the outage probability ($P_{out}(R,\bar{\gamma})$) with a finite number of summation operations ($\Sigma$), i.e., Equations (1), (2) and (4), the number of the summation operations is independent from the number ($L_R$) of the receive antennas 22 and the fading parameter (m) of the Nakagami channel model. The following Table 1 shows a comparison of computation of the performance information between this embodiment and the method proposed by S. Choi and Y. C. Ko in "Performance of Selection MIMO Systems with Generalized Selection Criterion over Nakagami-m Fading Channels," *IEICE Trans. Commun.*, E89-B (12), pages 3467-3470, 2006.

TABLE 1

| | Number of Summation Operations ($\Sigma$) | | | | |
|---|---|---|---|---|---|
| | $\bar{\gamma}_{(l)}$ | $P_{BER}$ | | $P_{out}(R,\bar{\gamma})$ | |
| This Embodiment | Eq. (1) 2 | Eq. (2) 3 | Eq. (3) 0 | Eq. (4) 2 | Eq. (5) 0 |
| S. Choi et al. | m × $L_R$ | m × $L_R$ | | N/A | |

As shown in Table 1, in the method proposed by S. Choi and Y. C. Ko, when the fading parameter (m) is equal to 1, computation of the average output SNR ($\bar{\gamma}_{(l)}$) and computation of the bit error rate ($P_{BER}$) both involve twelve summation operations ($\Sigma$) for an ultra-high-speed packet transmission scheme that is proposed by NTT DoCoMo and that includes twelve receive antennas 22 in the receiver 2 of the transceiver system 100. Compared with the method proposed by S. Choi and Y. C. Ko, the computation of the average output SNR ($\bar{\gamma}_{(l)}$) and computation of the bit error rate ($P_{BER}$) performed by the computing module 4 of this embodiment are considerably less. In addition, computation of the outage probability ($P_{out}(R,\bar{\gamma})$) will not increase when the fading parameter (m) or the number ($L_R$) of the receive antennas 22 is increased.

Figure 5:
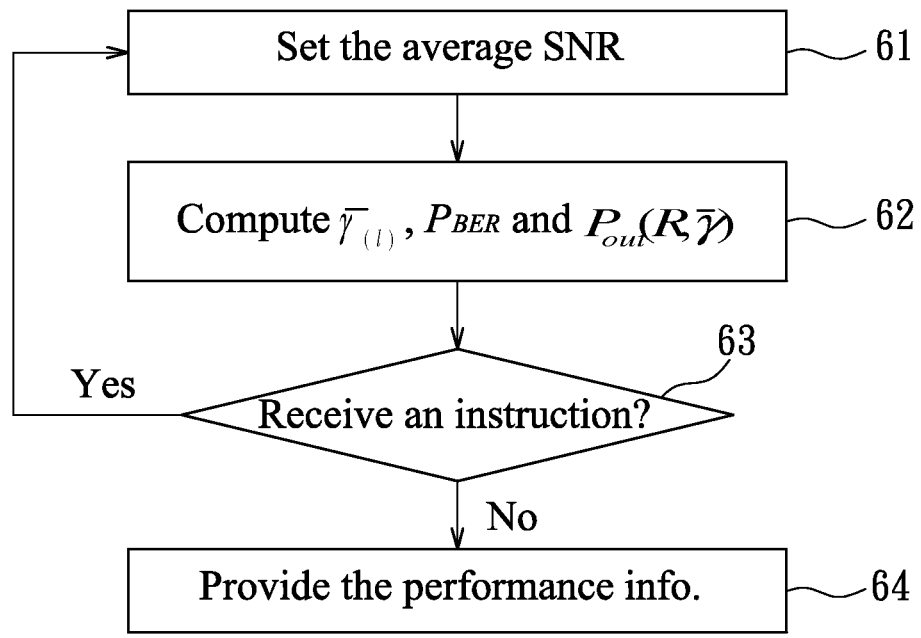
FIG. 5 is a flow chart of an evaluation method implemented by the evaluation device of this embodiment.

FIG. 5 shows a flow chart of an evaluation method implemented by the evaluation device 300 of this embodiment.

In step 61, the setting module 3 is operable to set each of the possible channels with the same average SNR ($\bar{\gamma}$).

In step 62, based upon one of the ordinal numbers (l), the fading parameter (m) of Nakagami distribution, the average SNR ($\bar{\gamma}$), the number ($L_T$) of the transmit antennas 12, and the number ($L_R$) of the receive antennas 22, the computing module 4 is operable to compute one of the average output SNR ($\bar{\gamma}_{(l)}$), the bit error rate ($P_{BER}$) and the outage probability ($P_{out}(R,\bar{\gamma})$) according to an appropriate one of Equations (1) to (5). In particular, the computing module 4 is operable to compute the average output SNR ($\bar{\gamma}_{(l)}$) based upon Equation (1). When the average SNR ($\bar{\gamma}$) is greater than the predetermined value, the computing module 4 is operable to compute the bit error rate ($P_{BER}$) and the outage probability ($P_{out}(R,\bar{\gamma})$) based upon Equations (3) and (5), respectively. Otherwise, the computing module 4 is operable to compute the bit error rate ($P_{BER}$) and the outage probability ($P_{out}(R,\bar{\gamma})$) based upon Equations (2) and (4), respectively. In practice, the computing module 4 may be configured to estimate another one of the average output SNR ($\bar{\gamma}_{(l)}$), the bit error rate ($P_{BER}$) and the outage probability ($P_{out}(R,\bar{\gamma})$) according to another one of the ordinal numbers (l).

In step 63, the output module 5 is operable to determine whether there is an instruction of setting another average SNR ($\bar{\gamma}$). The flow goes back step 61 when the determination is affirmative, and goes to step 64 when otherwise.

In step 64, the output module 5 is operable to provide the transceiver system 100 with at least one of the average output SNR ($\bar{\gamma}_{(l)}$), the bit error rate ($P_{BER}$) and the outage probability ($P_{out}(R,\bar{\gamma})$) corresponding to each of the average SNRs ($\bar{\gamma}$) set in step 61 as the transceiving performance information of the transceiver system 100.

Figure 6:
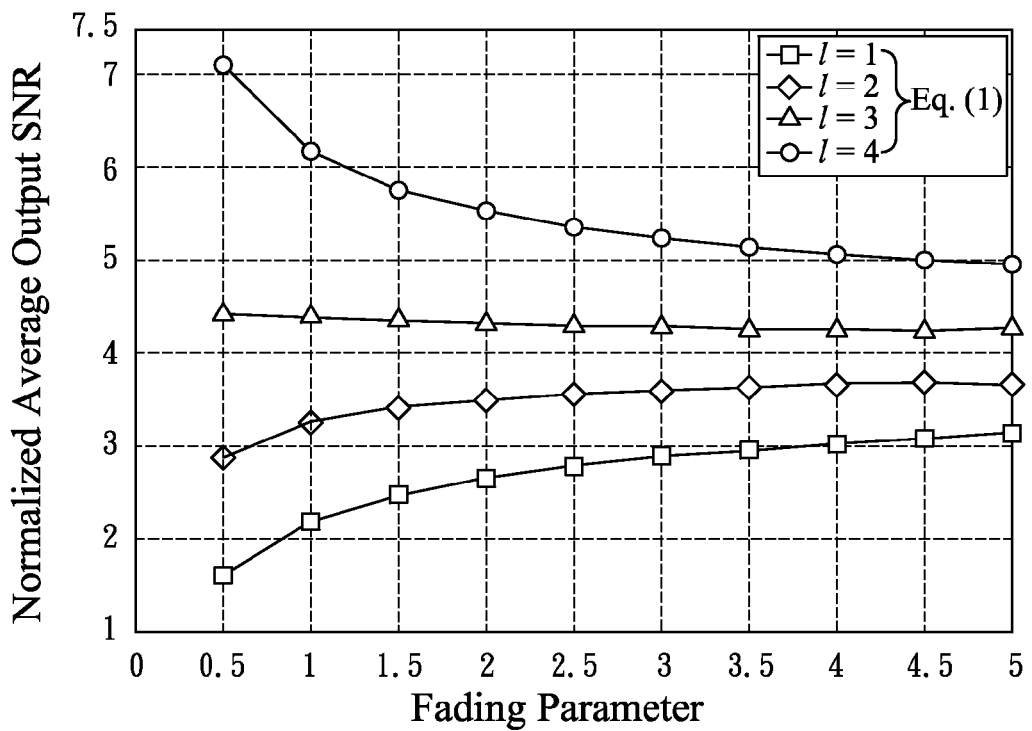
FIG. 6 is a simulation plot for illustrating normalized average output signal-to-noise ratios for respective transmit antennas of the transceiver system of the preferred embodiment with respect to fading parameters of Nakagami channel model.
Figure 7:
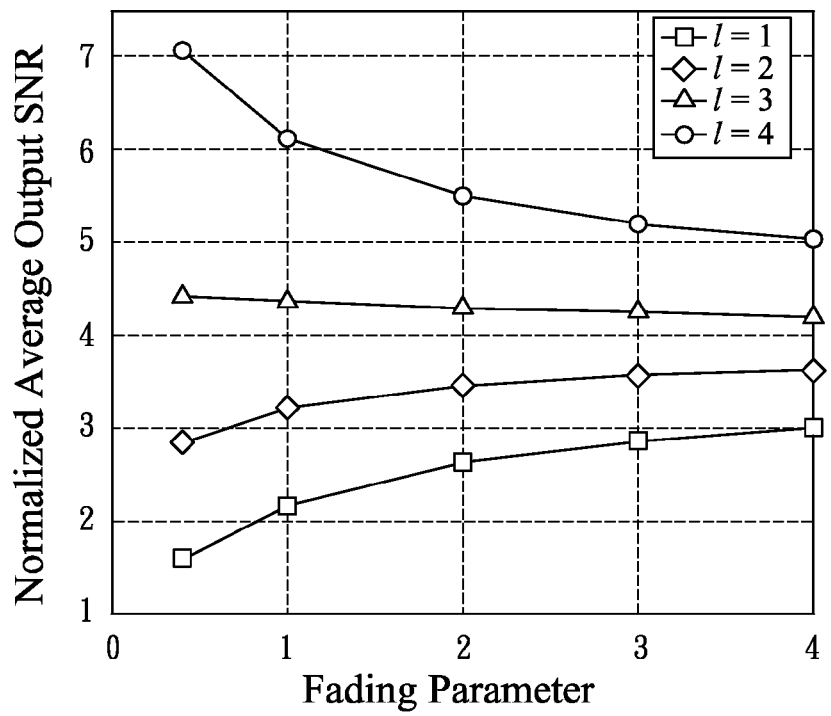
FIG. 7 is a simulation plot for illustrating normalized average output signal-to-noise ratios for respective transmit antennas of a conventional transceiver system with respect to the fading parameters of the same Nakagami channel model in FIG. 6.

FIG. 6 shows the average output SNRs ($\bar{\gamma}_{(l)}$), which are normalized after estimation according to Equation (1), for the respective transmit antennas 12 (i.e., according to the respective ordinal number (l)) with respect to fading parameters (m) of the Nakagami channel model when the transceiver system 100 includes four transmit antennas 12 ($L_T$=4) and four receive antennas 22 ($L_R$=4). FIG. 7 shows the normalized average output SNRs ($\bar{\gamma}_{(l)}$) according to the method proposed by S. Choi et al. under a transmission condition same as that in FIG. 6. It can be appreciated that the simulation results shown in FIGS. 6 and 7 are almost identical, that is to say, accuracy of the average output SNRs ($\bar{\gamma}_{(l)}$) estimated according to Equation (1) is substantially equal to accuracy of the average output SNRs ($\bar{\gamma}_{(l)}$) obtained through the method proposed by S. Choi et al. Moreover, from FIG. 6, when the channels between the transmitter 1 and the receiver 2 are relatively stable (i.e., the fading parameters (m) are relatively greater), the influence of the selection of the transmit antennas 12 on the average output SNRs ($\bar{\gamma}_{(l)}$) of the synthesized signal is relatively less. Namely, it is unnecessary for the diversity unit 11 to select one of the transmit antennas 12, which corresponds to a greatest average output SNR ($\bar{\gamma}_{(l)}$), for transmitting signals.

Figure 8:
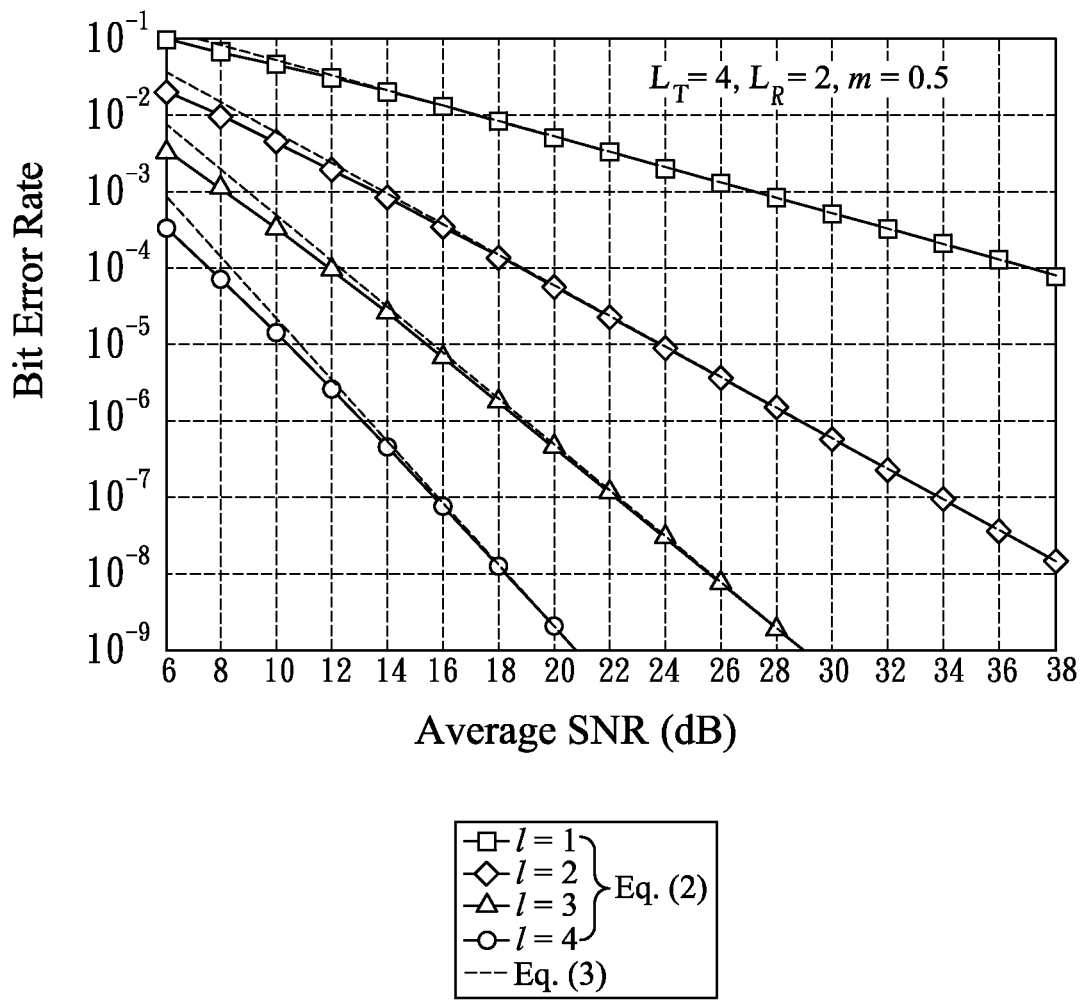
FIG. 8 is a simulation plot for illustrating a relationship between a bit error rate and an average signal-to-noise ratio.

FIG. 8 shows the evaluation results for the transceiver system 100 configured for BPSK modulation. In the case of FIG. 8, the transceiver system 100 includes four transmit antennas 12 ($L_T$=4) and two receive antennas 22 ($L_R$=2), and the fading parameter (m) of Nakagami distribution is set as 0.5. The symbols □, ◊, Δ and ○ represent the bit error rates ($P_{BER}$) computed according to Equation (2) when l=1 to 4, respectively, and the dashed lines "- - -" are respective asymptotes of the bit error rates ($P_{BER}$) estimated from Equation (3). It could be appreciated from FIG. 8 that the bit error rates ($P_{BER}$) decrease as the average SNRs ($\bar{\gamma}$) increase, that is to say, transmission error of the transceiver system 100 decreases and the performance thereof is relatively better. Also, the bit error rates ($P_{BER}$) from Equation (3) are almost identical to the bit error rates ($P_{BER}$) from Equation (2) as the average SNRs ($\bar{\gamma}$) increase, that is to say, Equation (3) is practical in computing the bit error rates ($P_{BER}$) when the average SNRs ($\bar{\gamma}$) are greater than a predetermined value.

Figure 9:
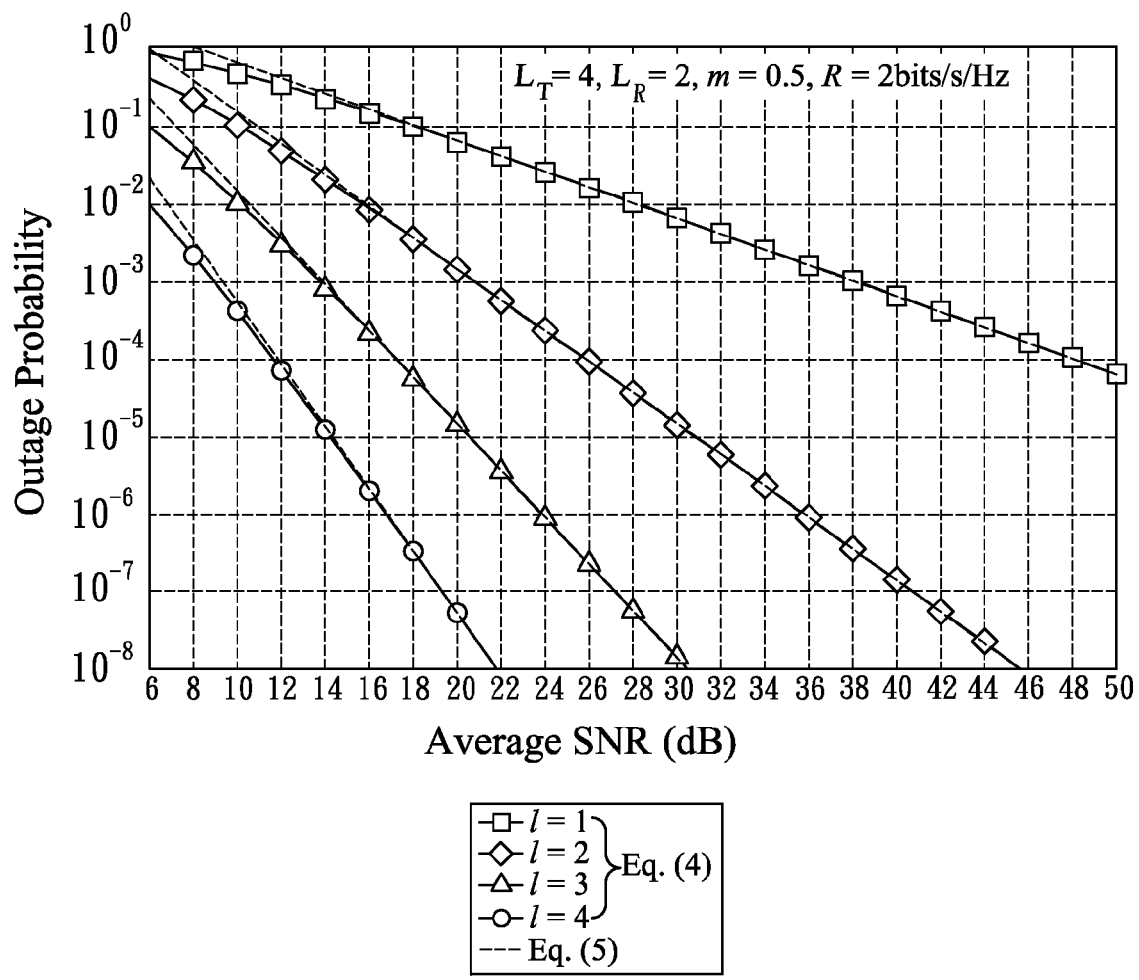
FIG. 9 is a simulation plot for illustrating a relationship between an outage probability and an average signal-to-noise ratio.

FIG. 9 shows the evaluation results for the transceiver system 100, where the transceiver system 100 includes four transmit antennas 12 ($L_T$=4) and two receive antennas 22 ($L_R$=2), the fading parameter (m) of Nakagami distribution is set as 0.5, and the given capacity (R) is 2 bits/s/Hz. The symbols □, ◊, Δ and ○ represent the outage probability ($P_{out}(R,\bar{\gamma})$) estimated from Equation (4) when l=1 to 4, respectively, and the dashed lines "- - -" are respective asymptotes of the outage probability ($P_{out}(R,\bar{\gamma})$) estimated from Equation (5). Similarly, it could be appreciated from FIG. 9 that the outage probability ($P_{out}(R,\bar{\gamma})$) estimated from Equation (5) is almost identical to the outage probability ($P_{out}(R,\bar{\gamma})$) estimated from Equation (4) as the average SNRs ($\bar{\gamma}$) increase. Namely, Equation (5) is practical in computing the outage probability ($P_{out}(R,\bar{\gamma})$) when the average SNR ($\bar{\gamma}$) is greater than a predetermined value.

In conclusion, the evaluation device 200 according to the present invention is capable of computing, based upon Equations (1) to (5), the average output SNR ($\bar{\gamma}_{(l)}$), the bit error rate ($P_{BER}$) and the outage probability ($P_{out}(R,\bar{\gamma})$) of the synthesized signal generated by the synthesis unit 21 of the transceiver system 100. Equations (1), (2) and (4) for computing the average output SNR ($\bar{\gamma}_{(l)}$), the bit error rate ($P_{BER}$) and the outage probability ($P_{out}(R,\bar{\gamma})$) are relatively simple (i.e., the number of the summation operations (Σ) is independent from the fading parameter (m) and the number ($L_R$) of the receive antennas 22), and the simplified Equations (3) and (5) respectively from Equations (2) and (4) are practical when the average SNR ($\bar{\gamma}$) is greater than a predetermined value. Thus, computation of the average output SNR ($\bar{\gamma}_{(l)}$), the bit error rate ($P_{BER}$) and the outage probability ($P_{out}(R,\bar{\gamma})$) based upon Equations (1) to (5) is relatively less, especially for the case of a relatively large number of the receive antennas 22 and a relatively large fading parameter (m).

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An evaluation device for providing a transceiver system with transceiving performance information thereof, the transceiver system including a transmitter that has a plurality of transmit antennas and a receiver that has a plurality of receive antennas for receiving signals from the transmitter, and modeling channels between the transmitter and the receiver using Nakagami distribution with a fading parameter, said evaluation device comprising:

a setting module operable to set an average signal-to-noise ratio (SNR) for the channels between the transmitter and the receiver of the transceiver system;

a computing module operable, based upon the fading parameter, the average SNR, a number of the transmit antennas and a number of the receive antennas, to estimate at least one of an average output SNR, a bit error rate and an outage probability that are related to signals received by the receiver of the transceiver system; and an output module operable to provide the transceiver system with the average SNR and said at least one of the average output SNR, the bit error rate and the outage probability as the transceiving performance information of the transceiver system;

wherein said computing module is operable to estimate one of the average output SNR, the bit error rate and the outage probability by computing a finite number of summation operations, and the number of the summation operations is independent from the number of the receive antennas and the fading parameter.

2. The evaluation device as claimed in claim 1, the transmit antennas of the transmitter being assigned with respective ordinal numbers in a specified sequence, wherein said computing module is operable, further based upon one of the ordinal numbers of the transmit antennas, to estimate one of the average output SNR, the bit error rate and the outage probability that are related to signals received by the receive antennas from a corresponding one of the transmit antennas that is assigned with said one of the ordinal numbers.

3. The evaluation device as claimed in claim 2, wherein said computing module is operable to estimate the average output SNR $\bar{\gamma}_{(l)}$ based upon $$\bar{\gamma}_{(l)} = \frac{l(\bar{\gamma}/m)}{(mL_R-1)!}\binom{L_T}{l}$$

$$\sum_{n=0}^{l-1}\binom{l-1}{n}(-1)^n \sum_{k=0}^{(L_T-l+n)(mL_R-1)} \beta_k \frac{(mL_R+k)!}{(L_T-l+n+1)^{mL_R+k+1}}$$

where l is said one of the ordinal numbers, m is the fading parameter, $\bar{\gamma}$ is the average SNR, $L_T$ is the number of the transmit antennas, $L_R$ is the number of the receive antennas, $\beta_0$=1, $\beta_1$=$L_T$-l+n, $$\beta_k = \frac{1}{k}\sum_{j=1}^{min(k,mL_R-1)} \frac{j(L_T-l+n+1)-k}{j!}\beta_{k-j}$$

for 2≤k≤($L_T$-l+n)($mL_R$-1)-1, and $\beta_k$=[($mL_R$-1)!]$^{-(L_T-l+n)}$ for k=($L_T$-l+n)($mL_R$-1).

4. The evaluation device as claimed in claim 2, wherein said computing module is operable to estimate the bit error rate $P_{BER}$ based upon $$P_{BER} = \frac{l}{(mL_R-1)!}\binom{L_T}{l}\sum_{n=0}^{l-1}\binom{l-1}{n}(-1)^n \times$$

-continued $$\sum_{k=0}^{(L_T-l+n)(mL_R-1)} \beta_k \frac{(mL_R+k-1)!}{(L_T-l+n+1)^{mL_R+k}} \left[\frac{1}{2}\left(1-\sqrt{\frac{\alpha}{1+\alpha}}\right)\right]^{mL_R+k} \times$$

$$\sum_{j=0}^{mL_R+k-1} \binom{mL_R+k-1+j}{j} \left[\frac{1}{2}\left(1+\sqrt{\frac{\alpha}{1+\alpha}}\right)\right]^j$$

where l is said one of the ordinal numbers, m is the fading parameter, $\bar{\gamma}$ is the average SNR, $L_T$ is the number of the transmit antennas, $L_R$ is the number of the receive antennas, $\alpha=\bar{\gamma}/[m(L_T-l+n+1)]$, $\beta_0=1$, $\beta_1=L_T-l+n$, $$\beta_k = \frac{1}{k}\sum_{j=1}^{min(k,mL_R-1)} \frac{j(L_T-l+n+1)-k}{j!}\beta_{k-j}$$

for $2 \leq k \leq (L_T-l+n)(mL_R-1)-1$, and $\beta_k=[(mL_R-1)!]^{-(L_T-l+n)}$ for $k=(L_T-l+n)(mL_R-1)$.

5. The evaluation device as claimed in claim 2, wherein, when the average SNR is greater than a predetermined value, said computing module is operable to estimate the bit error rate $P_{BER}$ based upon $$P_{BER} = \frac{(2mlL_R-1)!}{2^{2mlL_R-1}[(mL_R)!]^l(mlL_R-1)!}\binom{L_T}{l}\left(\frac{m}{\bar{\gamma}}\right)^{mlL_R}$$

where l is said one of the ordinal numbers, m is the fading parameter, $\bar{\gamma}$ is the average SNR, $L_T$ is the number of the transmit antennas, and $L_R$ is the number of the receive antennas.

6. The evaluation device as claimed in claim 2, wherein said computing module is operable to estimate the outage probability $P_{out}(R,\bar{\gamma})$, which corresponds to a given capacity R and the average SNR $\bar{\gamma}$, based upon $$P_{out}(R,\bar{\gamma}) = \frac{l}{(mL_R-1)!}\binom{L_T}{l}$$
$$\sum_{n=0}^{l-1}\binom{l-1}{n}(-1)^n \times \sum_{k=0}^{(L_T-l+n)(mL_R-1)} \beta_k \frac{\gamma(mL_R+k,[L_T-l+n+1]m\lambda/\bar{\gamma})}{[L_T-l+n+1]^{mL_R+k}}$$

where l is said one of the ordinal numbers, m is the fading parameter, $L_T$ is the number of the transmit antennas, $L_R$ is the number of the receive antennas, $\gamma(\ )$ is a low-level incomplete Gamma function, $\lambda=2^R-1$, $\beta_0=1$, $\beta_1=L_T-l+n$, $$\beta_k = \frac{1}{k}\sum_{j=1}^{min(k,mL_R-1)} \frac{j(L_T-l+n+1)-k}{j!}\beta_{k-j}$$

for $2 \leq k \leq (L_T-l+n)(mL_R-1)-1$, and $\beta_k=[(mL_R-1)!]^{-(L_T-l+n)}$ for $k=(L_T-l+n)(mL_R-1)$.

7. The evaluation device as claimed in claim 2, wherein, when the average SNR is greater than a predetermined value, said computing module is operable to estimate the outage probability $P_{out}(R,\bar{\gamma})$, which corresponds to a given capacity R and the average SNR $\bar{\gamma}$, based upon $$P_{out}(R,\bar{\gamma}) = \frac{m^{mlL_R}}{[(mL_R)!]^l}\binom{L_T}{l}\left(\frac{\lambda}{\bar{\gamma}}\right)^{mlL_R}$$

where l is said one of the ordinal numbers, m is the fading parameter, $L_T$ is the number of the transmit antennas, $L_R$ is the number of the receive antennas, and $\lambda=2^R-1$.

* * * * *